United States Patent [19]

Polley

[11] 4,422,473
[45] Dec. 27, 1983

[54] TANK BALL VALVE HAVING DEPENDING SLEEVE AND HANDLE ATTACHED TO THE SLEEVE

[75] Inventor: Richard B. Polley, St. Charles, Mo.

[73] Assignee: ACF Industries, Incorporated, New York, N.Y.

[21] Appl. No.: 299,364

[22] Filed: Sep. 4, 1981

[51] Int. Cl.³ .............................................. F16K 51/00
[52] U.S. Cl. ............................ 137/625.32; 251/144; 251/310; 251/345
[58] Field of Search ................... 251/144, 345, 310; 137/625.31, 625.32

[56] References Cited

U.S. PATENT DOCUMENTS

| | | | |
|---|---|---|---|
| 1,672,258 | 6/1928 | Hippenmeyer | 251/345 |
| 3,276,466 | 10/1966 | Herbert | 251/310 |
| 3,561,487 | 2/1971 | Reed, Jr. | 137/625.32 |
| 3,591,131 | 7/1971 | Carlson | 251/144 |
| 3,661,355 | 5/1972 | Rawstron et al. | 251/144 |
| 4,187,881 | 2/1980 | Kull | 137/625.31 |

Primary Examiner—A. Michael Chambers
Attorney, Agent, or Firm—Henry W. Cummings

[57] ABSTRACT

In a tank ball valve assembly the ball valve includes a hollow depending sleeve which extends below the tank bottom. A handle is attached to the sleeve to rotate the ball valve between open and closed positions. An outlet chamber surrounds the sleeve and includes a slot to allow rotation of the handle 90° between open and closed positions. The outlet chamber extends directly below the sleeve and the unloading spout is not offset.

15 Claims, 2 Drawing Figures

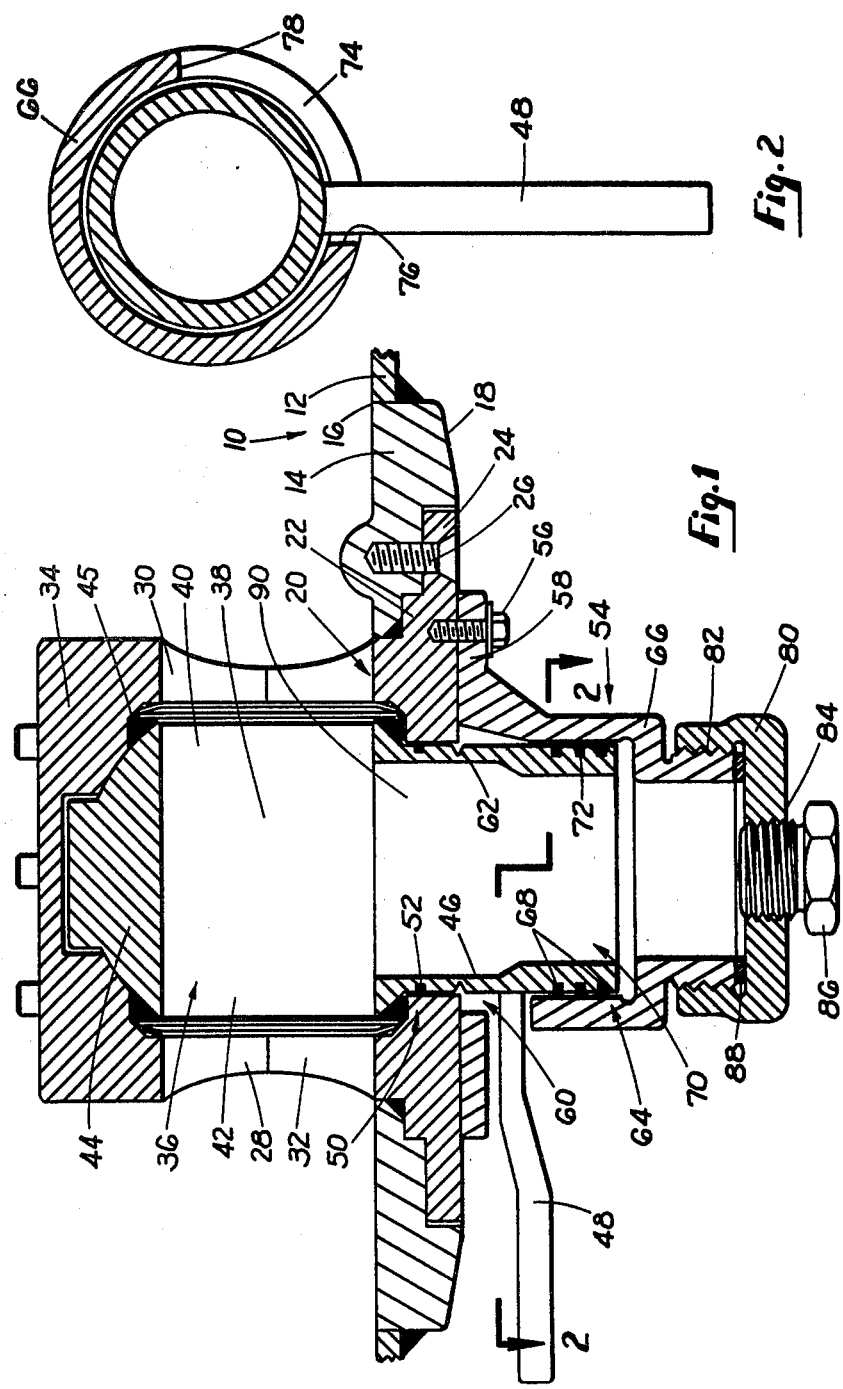

TANK BALL VALVE HAVING DEPENDING SLEEVE AND HANDLE ATTACHED TO THE SLEEVE

BACKGROUND OF THE INVENTION

In application Ser. No. 134,050, filed Mar. 26, 1980, now U.S. Pat. No. 4,318,531, issued Mar. 9, 1982 a tank car ball valve is disclosed and in application Ser. No. 134,231, filed Mar. 26, 1980, now U.S. Pat. No. 4,318,531, issued Mar. 9, 1982, a tank car cone valve is disclosed. These valves are located in valve housings located within the tank. The valves are rotated from below the tank by operating shafts which extend upwardly through outlet chambers and which engage the internal surface of the valves. Each of the valves contain inlet ports 180° apart and an outlet port in the bottom of the valve through which the operating shaft passes.

However, the operating shaft passing through the outlet port and through the outlet chamber provides a flow restriction during lading discharge and during loading if loading occurs through the outlet valve.

Furthermore, in these constructions, the unloading spout is offset with respect to the axis of the outlet port and the spout extends a considerable distance below the tank bottom. This makes it difficult to attach an unloading conduit and/or an auxiliary unloading valve. The greater extension provides more liklihood than a non-offset, shorter arrangement for loss of the outlet chamber due to impact.

Furthermore, a considerable moment is generated because of the offset portion, particularly if an auxiliary valve is attached.

The center of gravity of the offset outlet chamber is located significantly below and to one side of the valve. The effects of impact and vibratory fatigue loads are thus magnified by the moment applied through this extended center of gravity.

The offset also makes it difficult to install a steam jacket.

SUMMARY OF THE INVENTION

A ball valve is located within a ball valve housing in a tank vehicle, particularly a railway tank car. The ball valve includes a sleeve extending downwardly from the bottom of the ball and through the tank wall. An outwardly extending handle is attached to the sleeve. An outlet chamber surrounds the sleeve and is provided with a slot through which the handle extends permitting 90° rotation of the ball valve. The housing preferably is attached with shearable fasteners to a conventional tank car mounting flange. The sleeve includes means for shearing located on a plane common with the shearable fasteners. A conventional cap and plug are attached to the bottom of the housing. With this arrangement the outlet chamber is not offset. The moments introduced by impact and vibratory loads are of smaller magnitude and therefore less damaging. The outlet chamber need not extend as far below the tank bottom and it is thus easier to attach an unloading conduit or auxiliary valve. Furthermore, there is no flow obstruction due to the presence of an operating shaft extending through the ball valve outlet port and through the outlet chamber. The housing provides stops for the handle, resulting in ease of operation and little liklihood that the ball valve will be operated incorrectly.

IN THE DRAWINGS

FIG. 1 is a vertical sectional view of the ball valve assembly of the present invention.

FIG. 2 is a horizontal sectional view looking in the direction of the arrows along the line 2—2 in FIG. 1.

DESCRIPTION OF PREFERRED EMBODIMENTS

In the drawings, a railway tank car 10 includes a tank bottom 12. A mounting flange 14 is welded to an opening 16 in the tank bottom. The mounting flange includes a taper 18. A ball valve housing 20 is mounted within an opening 22 in the mounting flange 14. The housing includes an outwardly extending flange portion 24 through which extend fasteners 26 to hold the housing in place. The housing includes a vertical portion 28 which extends upwardly into the tank. Vertical portion 28 includes a pair of longitudinally spaced ports 30 and 32 to allow lading to flow into the housing. A housing cap 34 is located at the top of the housing. A ball valve 36 is located within the housing. The ball valve includes a body portion 38 having a pair of openings 40 and 42 which in one position align with the housing ports 30 and 32. The ball valve includes a top portion 44 extending into the housing and a ring seal 45 is provided between the housing and the ball valve.

In accordance with the present invention, the ball valve includes a downwardly extending hollow sleeve 46. This sleeve is cylindrical and extends below the housing mounting portion 20. An outwardly extending handle 48 is attached to one side of the sleeve as shown in FIG. 2. The handle 48 may be integral with the sleeve or may be removably connected with fasteners. Sealing means 50 are provided between the sleeve and the ball valve housing, for example, including an "O" ring 52.

An outlet chamber 54 is connected to the ball valve housing 20 with fasteners 56 extending through an outlet chamber flange portion 58. These fasteners are of the type which shear upon a specified impact force. Shearing means 60 are also provided in the sleeve which align with the plane defined by the shearable fasteners 56. The shear means 60 may comprise a shear groove 62 or the shear means 60 may result from the thickness and strength of the sleeve 46. If shearing occurs there is no projection of the valve, sleeve and housing below the mounting flange. Guide means 64 are provided between the lower portion 66 of the outlet chamber and the sleeve. Guide means 64 may comprise a series of guide rings 68 located on the sleeve. In addition, sealing means 70 are provided between the outlet chamber and the sleeve. For example, an "O" ring seal 72 may be provided.

Outlet chamber portion 66 includes a slot 74 and stops 76 and 78 which correspond to closed and open positions of the ball valve 36. Thus it is a simple matter to rotate the handle 48 between the respective stops 76 and 78, which correspond to respectively closed and open positions of the ball valve.

A cap 80 is provided which engages a threaded portion 82 on the outlet chamber. In addition, the cap is provided with an opening 84 which receives a conventional plug 86. A conventional gasket 88 is located between the cap and the bottom of the outlet chamber.

It will be apparent that the sleeve defines an outlet port 90 through which lading may flow outwardly when the cap 80 is removed.

In this regard, it is easier to attach an unloading conduit or auxiliary valve to the outlet chamber 54 because the outlet chamber does not extend as far below the tank bottom and it is not offset in a particular direction.

Furthermore, the location of handle 48 outside of the sleeve avoids a flow restriction that a handle extending up into the ball valve would normally cause. Thus the flow rate is not reduced by such an operating handle.

The slot 74 and the stops 76 and 78 provide simple operation of the valve. The closed and open positions are clearly identified by the stops 76 and 78 and it is unlikely that the valve can be damaged, for example by overtorquing, with this arrangement.

Furthermore, the outlet chamber unloading spout is not offset with respect to the discharge opening 90. Thus there is less chance that the outlet chamber will be impacted in transit and the possibility of lading spilling out is reduced.

Also the center of gravity of the outlet chamber is located within the chamber. Thus vibratory and fatigue loads are not magnified as in the case when the center of gravity is located outside the chamber.

It is thus seen that an improved ball valve assembly is provided with the depending sleeve and handle of the present invention.

What is claimed is:

1. A ball valve assembly comprising: a ball valve housing adapted to be mounted within a tank inlet including a hollow body portion having at least one inlet port; a ball valve located within said housing and including a valve body portion which in one position is adapted to close said housing port; said ball valve including a ball valve port adapted to align with said housing port to allow lading to enter said ball valve; said ball valve further including a depending hollow sleeve extending below said tank; an outlet chamber provided around said sleeve; operating handle means connected to said sleeve below said tank to move said ball valve between open and closed position; said outlet chamber being connected to said ball valve housing with shearable fasteners which define a shear plane, and said sleeve including shear means aligned with said shearable fasteners whereby upon hard impact said outlet chamber and a portion of said sleeve will shear off leaving said ball valve in place within said housing.

2. A ball valve assembly according to claim 1, wherein said shear means comprises a shear groove.

3. A ball valve assembly according to claim 1, wherein said ball valve housing is mounted within a mounting flange having a bottom surface, and said removable fasteners hold said housing within said mounting flange.

4. A ball valve assembly according to claim 3, wherein said mounting flange extends more than 1" below the tank bottom and is tapered.

5. A ball valve assembly according to claim 3, wherein said removable fasteners extend through a housing flange portion which does not extend below said mounting flange.

6. A ball valve assembly according to claim 3, wherein upon impact to said outlet chamber, said sleeve and said shearable fasteners shear along a plane defined by said bottom surface.

7. A ball valve assembly according to claim 1, wherein said outlet chamber extends directly below said sleeve.

8. A ball valve assembly according to claim 1, wherein sealing means are provided between said outlet chamber and said sleeve.

9. A ball valve assembly according to claim 8, wherein sealing means are provided between said outlet chamber and said sleeve.

10. A ball valve assembly according to claim 1, wherein said outlet chamber is provided with a slot through which said handle extends and wherein stop means are provided for said handle at either end of said slot corresponding to open and closed positions of the ball valve.

11. A ball valve assembly according to claim 1, wherein said shear means comprises a shear groove.

12. A ball valve assembly according to claim 1, wherein said ball valve housing includes a pair of inlet ports, and said ball valve includes a pair of inlet ports in fluid communication with said sleeve.

13. A ball valve assembly according to claim 1, wherein said ball valve housing is mounted within a tank mounting flange having a bottom surface, and removable fasteners hold said housing within said mounting flange.

14. A ball valve assembly according to claim 13, wherein said removable fasteners extend through a housing flange portion which does not extend below said mounting flange.

15. A ball valve assembly according to claim 14, wherein upon impact to said outlet chamber, said sleeve and said shearable fasteners shear along a plane defined by said bottom surface.

* * * * *